Figure 1:
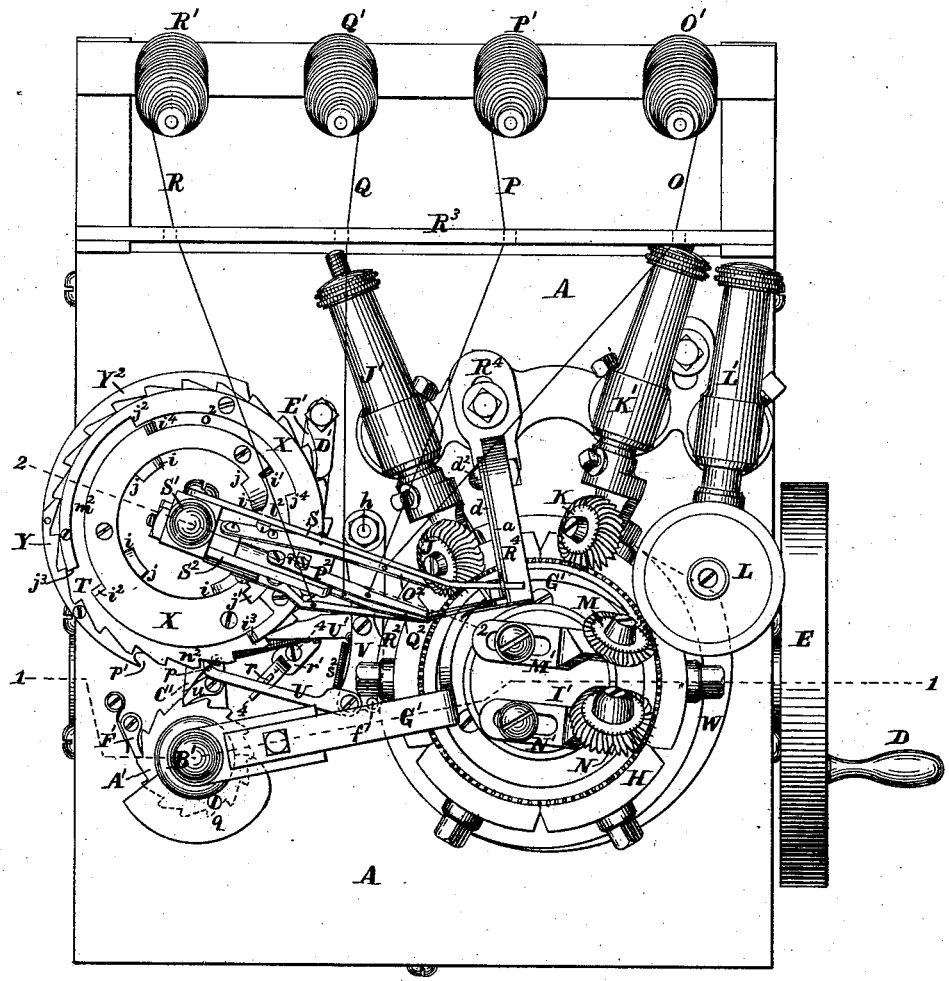

(No Model.)     J. BRADLEY.     6 Sheets—Sheet 1.
KNITTING MACHINE.

No. 244,735.     Patented July 26, 1881.

Witnesses:
W. E. Lombard.
E. E. Chandler.

Inventor:
John Bradley
by N. C. Lombard
Attorney.

(No Model.)  
6 Sheets—Sheet 2.

J. BRADLEY.  
KNITTING MACHINE.

No. 244,735.  
Patented July 26, 1881.

Witnesses:  
W. E. Lombard.  
E. E. Chandler.

Inventor:  
John Bradley  
by N. C. Lombard  
Attorney.

(No Model.)  6 Sheets—Sheet 3.

J. BRADLEY.
KNITTING MACHINE.

No. 244,735.  Patented July 26, 1881.

Witnesses:
W. E. Lombard.
E. E. Chandler.

Inventor:
John Bradley
by N. C. Lombard
Attorney.

(No Model.) 6 Sheets—Sheet 4.
J. BRADLEY.
KNITTING MACHINE.
No. 244,735. Patented July 26, 1881.
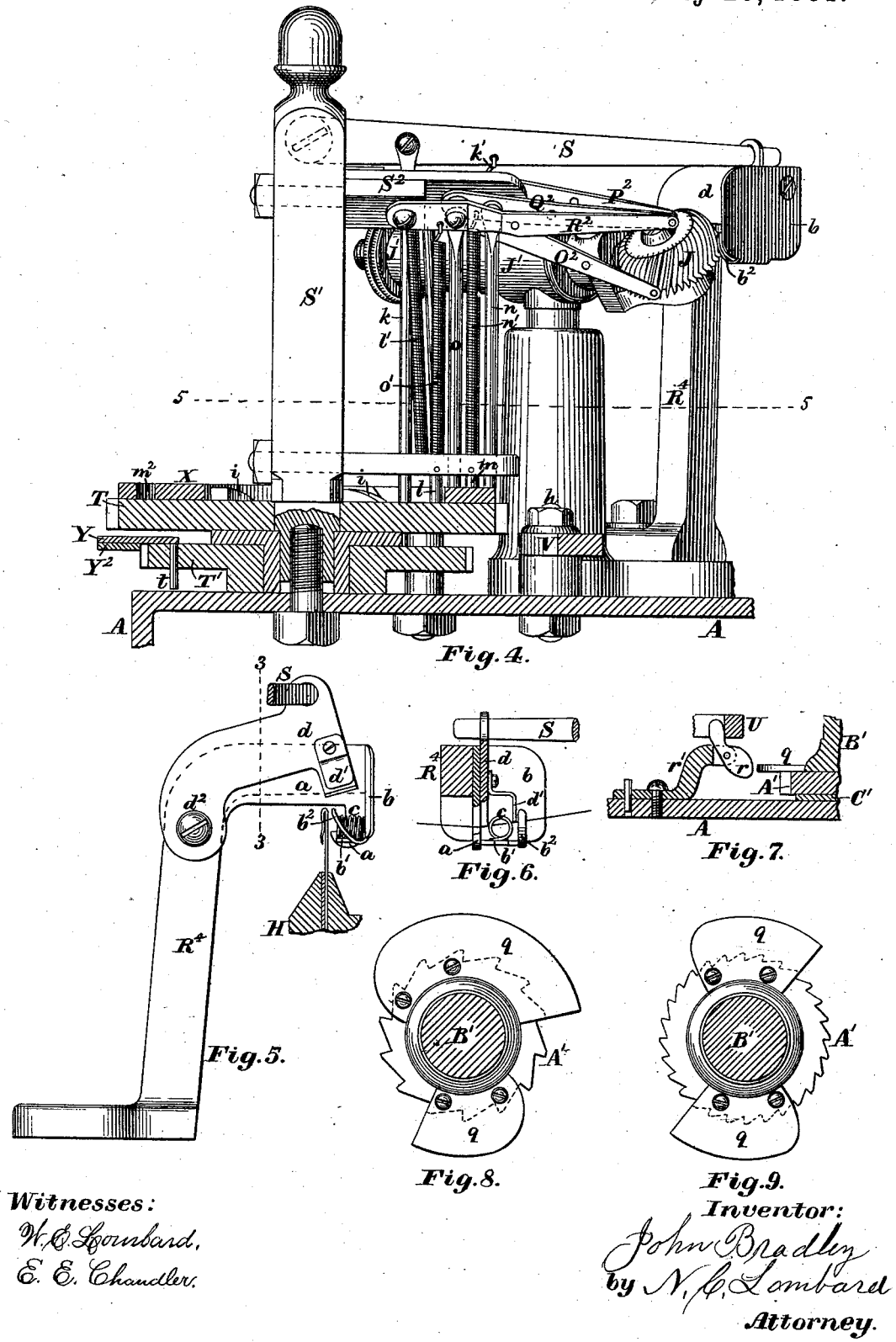
Witnesses:
W. E. Lombard.
E. E. Chandler.
Inventor:
John Bradley
by N. C. Lombard
Attorney.

(No Model.) 6 Sheets—Sheet 5.

J. BRADLEY.
KNITTING MACHINE.

No. 244,735. Patented July 26, 1881.

Witnesses:
W. E. Lombard
E. E. Chandler.

Inventor:
John Bradley
by N. C. Lombard
Attorney.

(No Model.) 6 Sheets—Sheet 6.

J. BRADLEY.
KNITTING MACHINE.

No. 244,735. Patented July 26, 1881.

Witnesses:
E. A. Hemmenway
Walter E. Lombard

Inventor:
John Bradley
by N. C. Lombard
Attorney.

UNITED STATES PATENT OFFICE.

JOHN BRADLEY, OF LOWELL, MASSACHUSETTS.

KNITTING-MACHINE.

SPECIFICATION forming part of Letters Patent No. 244,735, dated July 26, 1881.

Application filed September 4, 1880. (No model.)

*To all whom it may concern:*

Be it known that I, JOHN BRADLEY, a subject of Great Britain, now residing at Lowell, in the county of Middlesex and State of Massachusetts, have invented certain new and useful Improvements in Knitting-Machines, of which the following, taken in connection with the accompanying drawings, is a specification.

My present invention relates to that class of knitting-machines in which the needles are arranged and move in a circle, and work in connection with a series of co-operating wheels the blades or teeth of which engage with the circular series of needles, and by the simple rotation of said series of needles and the co-operating wheels all of the operations of knitting are performed, and which are generally termed "circular-knitting machines."

This invention is an improvement upon the machine illustrated and described in Letters Patent No. 227,213, granted to me May 4, 1880, in which provision was made for automatically manipulating two yarns of different colors in such a manner that a tubular fabric could be knit having alternate stripes of different colors repeated to the end of the tube without stopping the machine to change the yarns to throw one color out of action and another into action.

In knitting tubes to be manufactured into stockings it is desirable to have more of a variety of colors than could be used on the machine described in my former patent; and it is also desirable to knit broad plain bands at proper intervals to form the top of the leg and the foot of the stocking, for which there was no provision made in the machine described in the patent before cited.

To remedy these defects and produce a machine which will automatically manipulate three or more yarns of different colors, so as to throw them successively into and out of action with the needles, and arrange the stripes in any required order and make them of any desired width, is the object of my present invention; and it consists in the combination, with the series of needles and the co-operating wheels, of certain mechanical devices for manipulating the yarns and automatically severing and uniting the same, and for determining the order and width of the circumferential stripes, which devices will be readily understood by reference to the description of the drawings to be hereinafter given.

Figures 2, 10, 11:
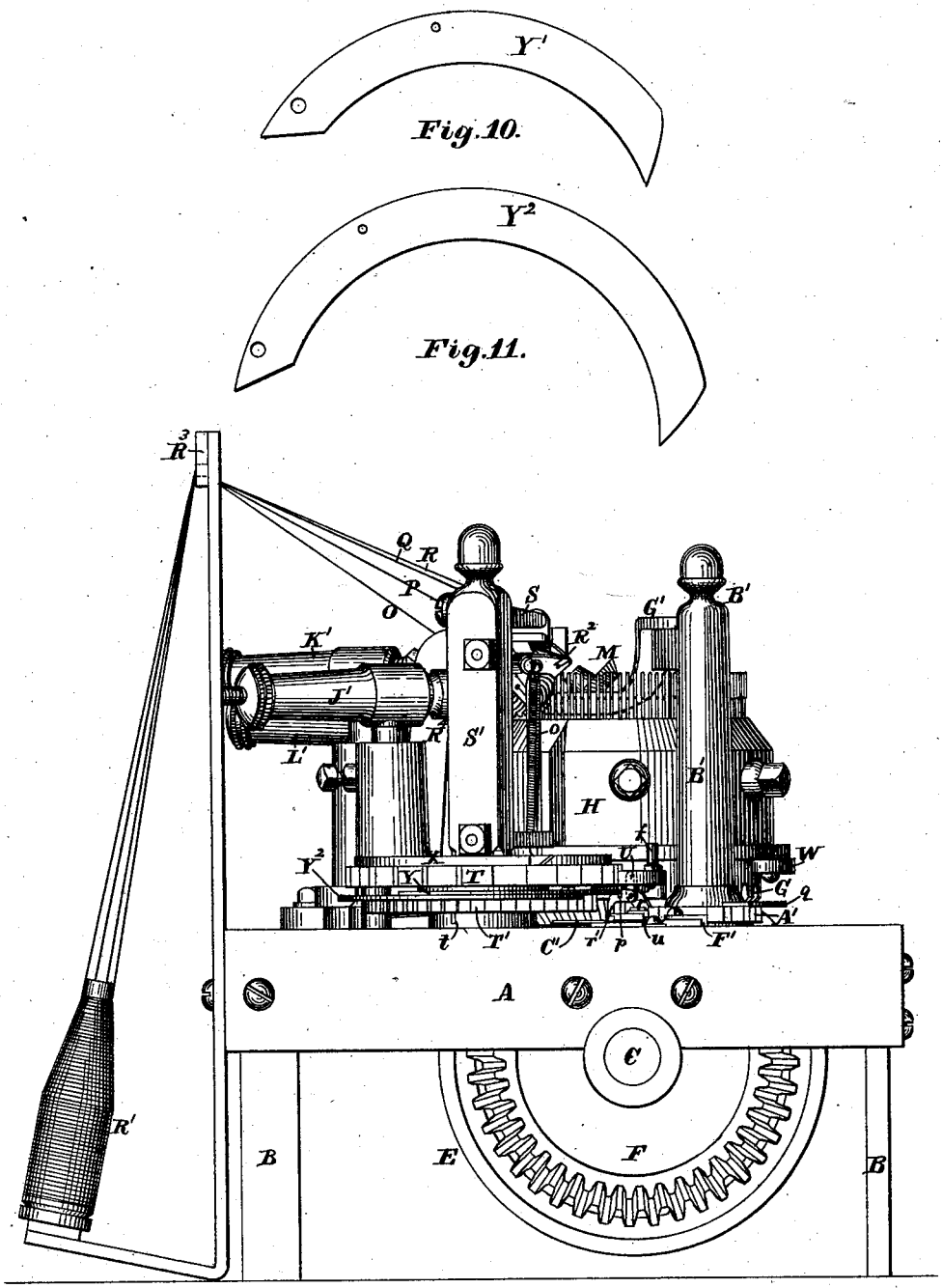
Figure 3:
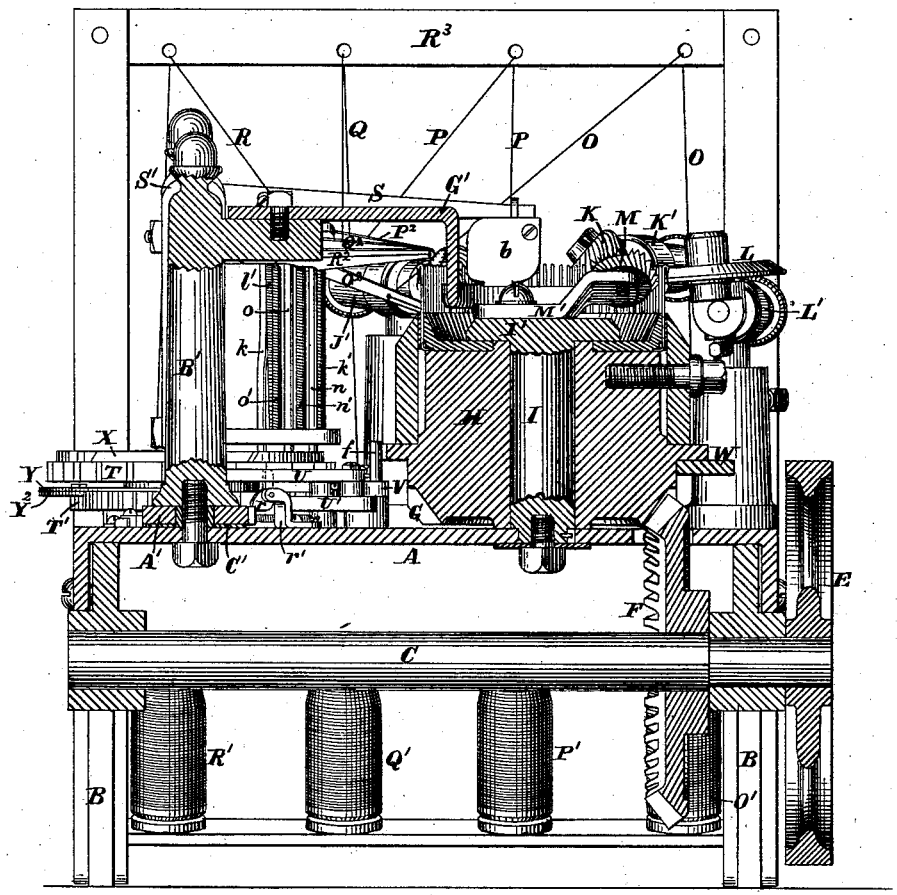
Figure 17:
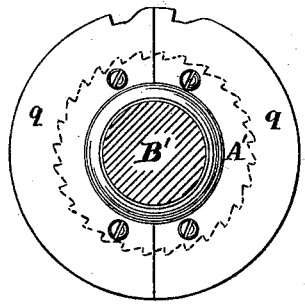
Figure 12:
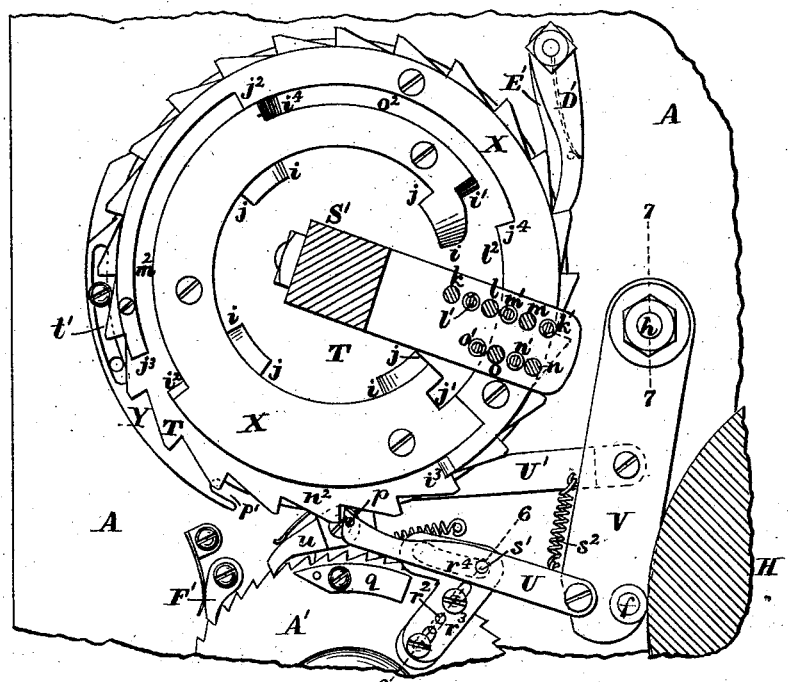
Figure 14:
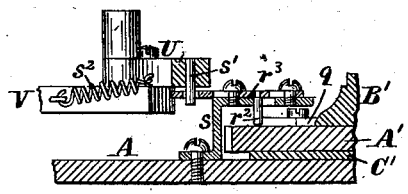
Figure 15:
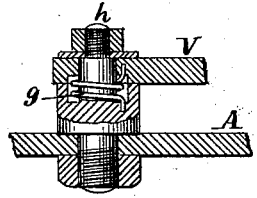
Figure 16:
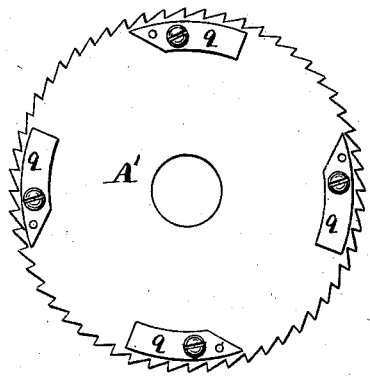
Figure 13:
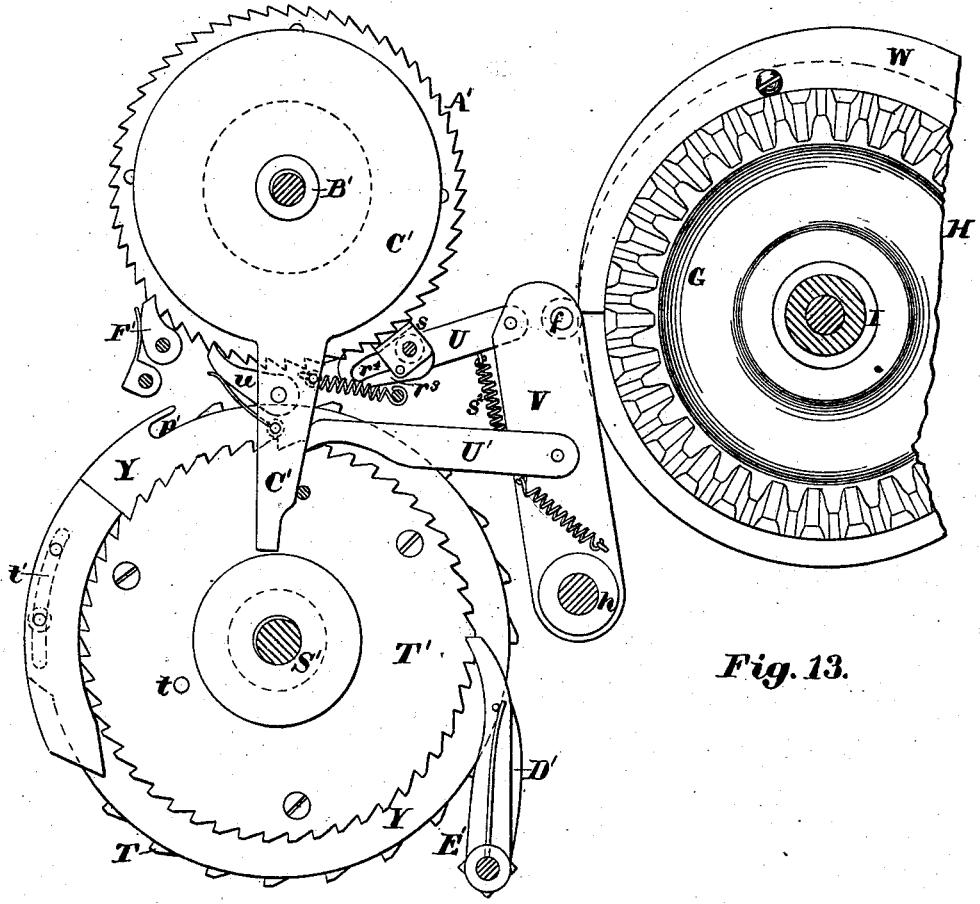

Figure 1 of the drawings is a plan of a machine embodying my invention and adapted to the use of four yarns of different colors. Fig. 2 is an end elevation of the same. Fig. 3 is a sectional elevation of the same, the cutting-plane being on line 1 1 on Fig. 1. Fig. 4 is a partial sectional elevation, the cutting-plane being on line 2 2 on Fig. 1. Fig. 5 is an elevation of the cutter-blades for severing the yarns, the spring for holding the severed ends and the stand for supporting said cutters and spring, the movable cutter being raised. Fig. 6 is a vertical section on line 3 3 on Fig. 5, and showing the yarn-guard and yarn-holding spring in elevation, with the upper cutter moved partly through its downward stroke. Fig. 7 is a partial vertical section on line 4 4 on Fig. 1. Figs. 8, 9, 10, and 11 are details, to be hereinafter referred to. Fig. 12 is a horizontal section on line 5 5 on Fig. 4. Fig. 13 is a partial horizontal section on the line of the upper surface of the bed of the machine, looking upward. Fig. 14 is a partial vertical section on line 6 6 on Fig. 12. Fig. 15 is a vertical section through the fulcrum of the cam-operated pawl-lever on line 7 7 on Fig. 12. Figs. 16 and 17 represent modifications of the pattern cam-wheel which determines the length of the plain sections of the stocking, and also determines its length.

Figs. 1, 2, and 3 are drawn to a smaller scale than the other figures.

A is the table or bed of the machine, supported upon suitable legs, B B, and having mounted in suitable bearings thereon the driving-shaft C, to which motion may be applied by hand by means of the crank D, or by means of a belt (not shown) and the pulley E. The shaft C has secured thereon the bevel-gear wheel F, which meshes into and imparts motion to a corresponding bevel-gear wheel, G, firmly secured upon the lower end of the circular stock or head H, which is mounted upon and revolves about the fixed vertical shaft I, and has secured thereon a series of needles of that kind which are known in the trade as "spring-needles," said needles being arranged in a circle concentric with the axis of the head H, and with their heads projecting upward above the upper end of said head in positions to receive and carry the several stitches being formed. Around this circular series of needles are arranged several wheels termed "working-wheels," the circumferences of which are of different shapes, and act upon and co-operate with said needles, and serve to manipulate the yarns in connection therewith, and perform upon the yarns all the operations of knitting, some of said wheels operating outside of the series of needles and some of them within the series, but all of them rotating with the needles.

J is the "stitch-wheel," so called, provided with radial blades or teeth set spirally around its periphery, which blades work between the needles and partially loop the yarn around them, this wheel being the wheel by which the yarn is first received in the operation of knitting, and is mounted upon an inclined axis carried by the "star-box" J', as shown.

K is the "dividing-wheel," so called, mounted upon an inclined axis carried by the star-box K', and is similar in form to the stitch-wheel J, and serves to place the loops more accurately upon the bodies of the needles.

L is the presser-wheel, by which the beards of the needles are depressed to allow the stitches to pass over them, and its circumference is therefore made smooth or without teeth or blades, and is mounted upon a vertical axis carried by the star-box L'.

M is the "landing-wheel," so called, by which the stitches are carried outside of the points of the beards of the needles, and N is the "knocking-over wheel," so called, by which the work is discharged from the needles. These two last-named wheels are located within the circle of the series of needles, and are mounted upon fixed axes borne by the brackets or stands M' and N' respectively, which are secured to and supported by the fixed disk or plate I' formed upon or secured to the upper end of the fixed vertical shaft I, about which the needle-head H revolves.

The wheels J, K, and L are arranged around the outside of the circular series of needles, and these, with the wheels M and N, all revolve with the needles and operate upon the yarn upon the needles to perform the several steps in the manipulation of the yarn, which constitutes knitting, in the order that they are mentioned above, and perform continuously the operations of plain knitting, except as will be hereinafter described.

So far as described the machine is constructed and operates in a well-known manner, and is not of my invention.

I will now proceed to describe that part of the mechanism which changes and severs the yarns automatically, and determines the width and arrangement of the several stripes which make up the pattern to be knit, as illustrated in Figs. 1, 2, 3, 4, 5, and 6, first premising that each stripe is composed of plain knitting with one yarn only, that the stripes run parallel with the courses of the stitches, and that the width of each stripe depends upon the number of courses thus knit before changing the color of the yarn, which is done automatically by the machine at the proper time.

The yarns O, P, Q, and R, of different colors, are wound upon the bobbins O', P', Q', and R' respectively, and are led therefrom through eyes in the bar R⁵, and thence through eyes in the yarn-guiding levers O², P², Q², and R², respectively, as shown in Figs. 1, 2, and 3. The yarn O, carried by the lowermost yarn-guide, O², is the one that is in action and being knit into the fabric when the several parts of the machine are in the positions shown in the drawings, while the yarns P, Q, and R, carried by the yarn-guides P², Q², and R² respectively, are thrown obliquely upward by said guides above the stitch-wheel J into a position just above the lower cutter-blade, $a$, of a pair of shears of peculiar construction, supported by the stand R⁴ in such a position that their cutting portions are within the circle of the needles, as shown in Figs. 1 and 5. The inner end of the stand R⁴ has secured thereto the thin shield or guard-plate $b$ to prevent the yarns from being caught by the revolving fabric and carried around with it, said guard-plate being provided with a shelf, $b'$, projecting horizontally therefrom toward the needles, to the upper side of which is secured the short helical spring $c$, into the coils of which the yarns are forced by the downward motion of the upper-cutter blade, $d$, and the bracket $d'$ secured thereon, after said yarns have been thrown into their extreme upward position above said spring by the upward movement of the movable ends of the yarn-guides O², P², Q², and R². The guard-plate $b$ is also provided at its lower edge with the curved finger $b^2$ to aid in properly locating the yarns in the coils of the spring $c$, all as shown in Figs. 5 and 6.

The cutter $a$ is secured to that part of the stand R⁴ which overhangs the needles, projects downward at its front end, and its cutting portion is a short rearward projection below the level of the top ends of the needles, as shown in Fig. 5.

The upper cutter-blade, $d$, is pivoted at $d^2$ to the stand R⁴, and has a downwardly-projecting portion at its front end, the lower edge of which co-operates with the blade $a$ to sever the yarns, the cutting-edge of the blade $d$ and the lower edge of the bracket $d'$ being so arranged relative to the spring $c$ and the edge of the lower cutter, $a$, that the yarns are pressed upon by the upper cutter and the bracket upon opposite sides of said spring and are thus forced well into the coils of said spring before the yarns are severed by the coming together of the cutters $a$ and $d$. The upper cutter is also provided with an eye to receive the movable end of the cutter-operating lever S, which is pivoted at its other end to the post S' set in a fixed position in the bed A, substantially as described in my patent before cited. The post S′ also forms a bearing for the ratchet-wheels T and T′, and also carries the laterally-projecting arm S², to which are pivoted the yarn-guiding levers O², P², Q², and R², two upon each side thereof, as shown. The ratchet-wheels T and T′ are so mounted upon their bearings that they may be revolved independently of each other, and are provided, respectively, with twenty-four and forty-eight teeth, by means of which and the pawls U and U′ pivoted to the lever V, and the cam W secured upon the head H, said wheels are intermittently moved about a common axis, the wheel T′ making one revolution to two revolutions of the wheel T—or, in other words, the two, when both are in motion, move at the relative speed of two to one. The cam W acts upon the stud $f$ set in the free or movable end of the lever V, or upon a roll mounted thereon, to move said lever and the pawls U and U′ forward to rotate the wheels, said lever and pawls being moved in the opposite direction as the cam continues to revolve by the reaction of the coiled spring $g$ which surrounds the fulcrum-pin $h$ of the lever V, as shown in Fig. 17. The pawl U′ is pivoted to the lever V at a point one-half way between the fulcrum of said lever and the point where the pawl U is pivoted thereto, and as a consequence the movement of the pawl U′ at each vibration of the lever V is just one-half the movement of the pawl U, whereby the wheel T′ makes one revolution to two revolutions of the wheel T, the purpose of which will presently appear.

Upon the upper surface of the wheel T is secured a segmental cam-plate, X, which by its inclines $i, i, i, i, i', i^2, i^3$, and $i^4$, and offsets $j, j, j, j, j', j^2, j^3$, and $j^4$ act respectively upon the rods $k, l, m, n$, and $o$ to vibrate the shear-operating lever S and the yarn-guides O², P², Q², and R², the rods $k, l, m, n$, and $o$ being held in contact with said cam-plate, or the upper surface of the wheel T, by the tension of the springs $k', l', m', n'$, and $o'$ respectively. The rod $k$ and spring $k'$ are connected to the lever S between its fulcrum and its connection with the shear-blade $d$, so that the passage of the cam-plate X beneath the lower end of the rod $k$ raises the movable end of the lever S and the shear-blade $d$ against the tension of the spring $k'$, and when the cam-plate passes from beneath the rod $k$ the reaction of the spring $k'$ causes a sudden descent of the lever S and the shear-blade $d$, which severs any yarn which may be between it and the lower cutter-blade $a$ in an obvious manner, and at the same time the yarn is forced into or between the coils of the spring $c$, where the severed end is retained till the yarn is again thrown into action with the stitch-wheel by the downward movement of its guiding-lever. The rods $l, m, n$, and $o$ and springs $l', m', n'$, and $o'$ are all connected to their respective yarn-guiding levers O², P², Q², and R² between their fulcrums and their free or movable ends, so that the passage of the cam-plate X beneath the lower end of either of said rods causes the yarn-guide to which said rod is connected to be thrown upward so as to throw the yarn carried thereby out of action with the stitch-wheel and into a position to be forced into the holding-spring $c$ and to be severed by the descent of the cutter $d$, and when the cam-plate passes from beneath said rod the reaction of its co-operating spring causes the yarn-guide to be thrown downward and carry the previously severed yarn into action again with the stitch-wheel and the needles.

In order to properly manipulate three or more yarns of different colors the cam-plate X is made of peculiar construction, according to the the number of yarns used, extending around about two-thirds of a complete circle when three colors are to be used, or entirely around the circle when four or more colors are to be used, as illustrated in Figs. 1 to 4, inclusive.

In the machine illustrated, when it is desired to work from yarns of different colors, the cam-plate X is made in the form of a ring, and has cut through or from it four segmental slots or portions, $l^2, m^2, n^2$, and $o^2$, each equal in length to one-fourth of the circumference of a circle, and of a width somewhat greater than the diameter of the rods $l, m, n$, and $o$, one end of each of said slots or cut-away portions terminating in an incline, $i', i^2, i^3$, or $i^4$, and the other end of each in the perpendicular offset $j', j^2, j^3$, or $j^4$, said slots being so arranged relative to each other and to the rods $l, m, n$, and $o$ that when the wheel T and the cam X is revolved said segmental slots or cut-away portions pass beneath the lower ends of the rods $l, m, n$, and $o$ and allow them to drop from the top of the cam-plate to the upper surface of the wheel T successively at intervals of one-quarter of a revolution of said wheel and cam, and raise each rod again when the wheel and cam has made one-quarter of a revolution from the time when said rod dropped from the face of the cam, and so that whenever one of the rods $l, m, n$, or $o$ is resting on the surface of the wheel T, and the yarn-guide to which it is connected is thrown down to carry its yarn into action with the stitch-wheel, all the other rods will be resting upon the upper surface of the cam X, and their yarn-guiding levers will have their inner or movable ends raised upward to carry their yarns out of action with the stitch-wheel and into a position to be forced between the coils of the holding-spring $c$, and to be severed by the descent of the cutter-blade $d$, said yarn-guides being each maintained in said elevated position during three-quarters of the revolution of the wheel T, and in the depressed position indicated by the lever O² in Figs. 1 and 4, during the other quarter of the revolution of said wheel. The cam X is also provided with four inclines, $i\ i\ i\ i$, and offsets $j\ j\ j\ j$, equidistant from the axis of the wheel T, and the inclines, as well as the offsets, equidistant from each other, said inclines serving to raise the cutter $d$, acting through the medium of the rod $k$ and lever S, preparatory to a sudden descent of said cutter, caused by the reaction of the spring $k'$ when the offsets $j$ pass from beneath the rod $k$, which movement takes place immediately after a yarn has been thrown out of action with the stitch-wheel.

With a cam constructed as described, and the wheel T provided with twenty-four teeth, as shown in the drawings, alternate stripes of four different colors consisting of six courses each will be knit throughout the length of the tube; but if the wheel T is provided with forty-eight teeth, then each each stripe would consist of twelve courses. If, however, it is desired to make the stripes of different widths— as, for instance, one color narrow, the next one wider, the third narrow, and the fourth wider— the slots or cut-away portions $l^2$, $m^2$, $n^2$, and $o^2$, instead of being of equal length, as shown, would be made of different lengths—say $l^2$ and $n^2$ shorter, and $m^2$ and $o^2$ longer, than shown in the drawings—and the inclines $i\ i$ and offsets $j\ j$ would be correspondingly located.

To produce a fabric from three or more colors composed of a cluster of three or more narrow stripes of different colors alternating with one wider stripe of one of the same colors, I use the ratchet-wheel T', having secured thereon the cam Y, adapted to act upon the pin $p$, set in the under side of the pawl U, and thereby throw said pawl out of action with the teeth of the wheel T, and so arrest the motion of the cam-plate X for a longer or shorter time, and thus permit a greater number of courses to be knit from the yarn then in action than could be the case if the motion of the wheel T were continuous. The cam Y should be made of a circumferential length, sufficient to hold the pawl U out of action with the teeth of the wheel T during six or twelve reciprocations of the pawls U and U', and may be increased so as to hold said pawl U out of action during eighteen or twenty-four reciprocations of said pawls by securing thereto the supplementary segments Y' or Y², by means of which a variety of designs or patterns will be produced as follows: If the cam Y be made of the shortest length mentioned, the pattern will consist of six stripes of six courses each, of four different colors, arranged in a cluster and followed by a broad stripe of twelve courses. If the cam Y is made of the next longer length mentioned, then the pattern would produce a fabric composed of a cluster of five stripes of six courses each of four different colors, followed by a stripe of eighteen courses of one of the same colors. Now, if the segment Y' (shown in Fig. 10) be added to the cam Y of the last-mentioned length, the fabric produced thereby would be composed of a cluster of four stripes of six courses each, of different colors, followed by a single stripe or band of twenty-four courses of one of the same colors. If, now, the segment Y² (shown in Fig. 11) be substituted for Y', the fabric produced would be composed of a cluster of three stripes of six courses each, of different colors, followed by a broad band of thirty courses of a different color, it being understood that the cam X attached to the wheel T remains unchanged under the different conditions of the cam Y in the examples above given. The cam Y is provided at its rear end, or the point where it releases the pawl U, with a notch, $p'$, to allow said pawl to move sufficiently far to move the wheel T a distance equal to the length of a tooth without the pin $p$ coming in contact with and moving the cam Y a greater distance than is due to the stroke of the pawl U'. This arrangement of stripes does very well for the body of the stocking, but it is desirable to knit broad plain bands at regular and equal intervals, from which to form the tops and feet of the stockings, to do which automatically I use the ratchet-wheel A', mounted upon a journal formed on the base of the post B', and carrying upon its upper surface the cam $q$, which acts upon the elbow-lever $r$, pivoted in the stand $r'$ to vibrate it about its fulcrum, the upper end of said lever acting upon the pawl U to throw it out of action with the teeth of the wheel T and hold it out of action while the cam $q$ is passing the lever $r$. The wheel A' is intermittently moved about its axis a distance equal to the length of one of its teeth at each revolution of the ratchet-wheel T' by means of the pin $t$, set in the under side of said wheel T', acting upon the free end of the lever C', which has its fulcrum on the post B' and carries the pawl $u$, which engages with the teeth cut in the periphery of the wheel A' in an obvious manner.

The wheel A' may be provided with a greater or less number of teeth, as shown in Figs. 1 and 8 or 9, and may have one cam, $q$, attached thereto, as shown in Fig. 1, or two cams of equal length, as shown in Fig. 9, or two cams of different lengths, as shown in Fig. 8, or the wheel A' may be made of larger diameter and be provided with a correspondingly-increased number of teeth and have secured thereto four cams, $q$, of the modified form shown in Fig. 16, according to the desired pattern or design to be knit.

It will be readily seen that as the wheel A' moves only a distance of one tooth to each complete revolution of the wheel T', and that forty-eight courses are knit to each complete revolution of said wheel T', it follows that whenever the pawl U is thrown out of engagement with the teeth of the wheel T by the action of either of the cam-plates $q$, and the motion of the cam-plate X is arrested, the yarn which is then in action and being knit into the fabric will continue to be so knitted until the wheel A' has moved a sufficient number of teeth to carry the cam-plate $q$ past the lever $r$ and released the pawl U, and the result will be that a broad plain portion of the tube will be knit of the desired length to make two stocking-feet or the tops of two legs.

D', E', and F' are stop-pawls, which engage, respectively, with the teeth of the wheels T, T', and A', to prevent backward motion thereof, all of the pawls being pressed into contact with their respective wheels by means of suitable springs applied thereto.

The post B' carries at its upper end the curved cloth-presser or push-back G', which operates in the usual manner.

In my former patent the yarn severing and holding devices were mounted upon the star-box which carried the stitch-wheel, and were adjustable therewith, which, in practice, was found to be objectionable, and hence in the present machine I have mounted said devices upon a support independent of either of the star-boxes and that occupies a fixed position at all times.

The cams $q$ on the wheel A', (shown in Fig. 16,) are designed to operate in combination with a modified form of pawl-tripping devices, (shown in Figs. 12 and 14,) said cams engaging with the pin $r^2$ set in the under side of a plate, $r^3$, mounted upon suitable guiding pins or screws set in the stand $s$, secured in a fixed position upon the bed A, said plate $r^3$ being adapted to be reciprocated in a direction radial to the axis of the wheel A', and provided in its rear end with a transverse slot, $r^4$, through which the pin $s'$, set in the under side of the pawl U, projects, all so arranged that while the inner edge of either of the cams $q^2$ is engaged with the pin $r^2$ the pawl U will be thrown out of action with the teeth of the wheel T, and so held till the cam $q^2$ has released the pin $r^2$, when the pawl U will be thrown into engagement with the teeth of the wheel T by the reaction of the spring $s^2$ in an obvious manner.

With the wheel A' constructed as shown in Fig. 8, and provided with the two cams of unequal lengths, as shown in said Fig. 8, a plain band will be knit to form the top of a stocking-leg, then a series of clusters of narrow stripes alternating with a single broader stripe between each two clusters of narrow stripes, and at the proper time, by the action of the shorter cam $q$, a broader plain stripe or band will be knit for the calf of the leg, another series of clusters of narrow stripes alternating with broader stripes will follow, and when the longer cam $q$ again comes into action a broad plain section will be knit from which to form the feet of two stockings.

A different pattern consisting of a plain top, a leg composed of a series of narrow stripes of different colors, and a plain foot may be automatically knit upon the machine represented in Figs. 1, 2, 3, and 4 by simply removing the pin $p$ from the end of the pawl U, by which act the cam Y will be rendered inoperative, and as a consequence no broad stripes will be intermingled with the narrow ones.

With the pin $p$ removed and the shorter cam $q$ applied to the wheel A a single broad stripe or band will be knit in the center of the striped portion of the stocking.

The cam Y may be provided with a curved slot, $t'$, and the segments Y' and Y² may be secured to said cam Y, so as to be adjustable thereon, as a means of accurately adjusting the circumferential length of the whole cam, as shown in Fig. 12. This method of attaching the segments simplifies the construction of the same, in that it obviates the necessity of great accuracy in drilling the screw-holes or finishing the forward end of said segments.

In Fig. 17 is shown a plan of a modified form of the pattern-cam $q$ made in two halves, and secured to the upper surface of the ratchet-wheel A', by the use of which, in combination with the cams X and Y, the ratchet-wheels T and T', and the pawls U and U', a stocking having a striped section at the top of the leg, with all the rest of the stocking plain, may be automatically knit, each revolution of the cam $q^3$ producing a pair of stockings or the tubular material from which to form two stockings of the pattern referred to.

A division of this case was filed as a separate application January 24, 1881, in which some of the parts herein shown and described are claimed in combination with parts not shown or described in this specification, and therefore I do not claim in this application anything claimed in said division-application.

What I claim as new, and desire to secure by Letters Patent of the United States, is—

1. In combination with the needle-head and working-wheels of a spring-needle circular-knitting machine provided with two or more yarn-guides and yarn severing and holding devices, the cam W, lever V, pawls U and U', carried by the lever V, the ratchet-wheels T and T', adapted to move at different speeds, and the cams X and Y, all arranged and adapted to operate substantially as described.

2. The combination of two or more yarn-guiding levers, yarn severing and holding devices, a pattern-cam, mechanism connecting said cam with the yarn-guides and yarn-severing devices, the ratchet-wheels T, T', and A', cams X, Y, and $q$, and mechanism for imparting to said ratchet-wheels and cams intermittent rotary motions, substantially as described, for the purposes specified.

3. The combination of two or more yarn-guides, a severing device, a yarn-holding device, a pattern-cam, mechanism connecting said cam with the yarn-guides and the severing device, with the ratchet-wheels T and T', the pawls U and U', the former provided with the pin $p$, the cam Y, secured to and rotating with the wheel T', the lever V, and the cam W, all arranged and adapted to operate substantially as and for the purposes described.

4. The combination of two or more yarn-guides, a severing device, a yarn-holding device, a pattern-cam, mechanism connecting said cam with the yarn-guides and the severing device, the ratchet-wheels T and T', the pawls U and U', the former provided with the pin $p$, the cam Y, secured to and rotating with the wheel T', the lever V, and cam W, and a removable segment, Y², secured to said cam Y, for the purposes described.

5. In combination with the ratchet-wheel T, the pawl U, and mechanism for reciprocating said pawl, the ratchet-wheel A', mechanism for imparting to said wheel A' an intermittent rotary motion, one or more cams secured upon the wheel A', and mechanism connecting said cams with the pawl U, and adapted to disengage said pawl from engagement with the wheel T, substantially as described.

6. The combination of the ratchet-wheels T and T', the pawls U and U', means of reciprocating said pawls through strokes of different lengths, the pin $t$, set in the under side of the wheel T', the lever C', having mounted thereon the pawl $u$, the ratchet-wheel A', one or more cams secured upon the wheel A', and the elbow-lever $r$, all arranged and adapted to operate substantially as and for the purposes described.

7. The yarn-guard plate $b$, provided with the shelf $b'$, the spring $c$, and the curved finger $b^2$, all constructed and arranged substantially as and for the purposes described.

8. The combination, in a circular-knitting machine, of the ratchet-wheel T, having secured thereon the cam X, the wheel T', carrying the cam Y, and provided with the pin $t$, lever C', carrying the pawl $u$, ratchet-wheel A', cam $q$, lever $r$, and means of imparting to the wheels T and T' intermittent rotary motions about their axes at different speeds, substantially as described.

Executed at Boston, Massachusetts, this 2d day of September, A. D. 1880.

JOHN BRADLEY.

Witnesses:
W. E. LOMBARD,
E. E. CHANDLER.